(12) United States Patent
Takeda et al.

(10) Patent No.: US 11,990,795 B2
(45) Date of Patent: May 21, 2024

(54) ADHESIVELY-LAMINATED CORE FOR STATOR, METHOD OF MANUFACTURING SAME, AND ELECTRIC MOTOR

(71) Applicant: NIPPON STEEL CORPORATION, Tokyo (JP)

(72) Inventors: Kazutoshi Takeda, Tokyo (JP); Hiroyasu Fujii, Tokyo (JP); Shinsuke Takatani, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 431 days.

(21) Appl. No.: 17/413,556

(22) PCT Filed: Dec. 17, 2019

(86) PCT No.: PCT/JP2019/049303
§ 371 (c)(1),
(2) Date: Jun. 13, 2021

(87) PCT Pub. No.: WO2020/129946
PCT Pub. Date: Jun. 25, 2020

(65) Prior Publication Data
US 2022/0052570 A1 Feb. 17, 2022

(30) Foreign Application Priority Data
Dec. 17, 2018 (JP) .................. 2018-235869

(51) Int. Cl.
*H02K 1/18* (2006.01)
*C09J 163/00* (2006.01)
*H01F 27/245* (2006.01)

(52) U.S. Cl.
CPC ............ *H02K 1/185* (2013.01); *C09J 163/00* (2013.01); *H01F 27/245* (2013.01)

(58) Field of Classification Search
CPC .. H02K 1/04; H02K 1/18; H02K 1/30; H02K 15/02
(Continued)

(56) References Cited

U.S. PATENT DOCUMENTS 3,386,058 A 5/1968 Michel
4,025,379 A 5/1977 Whetstone
(Continued)

FOREIGN PATENT DOCUMENTS

CN 102792556 A 11/2012
EP 3553799 A1 10/2019
(Continued)

OTHER PUBLICATIONS

Matweb, "Plaskolite West Optix® CA—41 FDA General Purpose Acrylic Resin", 2 pages, retrieved online Dec. 19, 2022, www.matweb.com/search/DataSheet.aspx?MatGUID=ceec51c04f714fb383d01496424432d9. (Year: 2022).
(Continued)

*Primary Examiner* — Jose A Gonzalez Quinones
(74) *Attorney, Agent, or Firm* — Renner, Otto, Boisselle & Sklar, LLP

(57) ABSTRACT

An adhesively-laminated core for a stator capable of suppressing an iron loss of an electric motor and also having excellent productivity is provided. The adhesively-laminated core for a stator includes a plurality of electrical steel sheets which are stacked on one another and of which both surfaces are coated with insulation coatings, and adhesion parts which are disposed between the electrical steel sheets adjacent to each other in a stacking direction and cause the electrical steel sheets to be adhered to each other. All sets of the electrical steel sheets adjacent to each other in the stacking direction are adhered via the adhesion parts. An adhesive forming the adhesion parts is a two-agent type
(Continued)

acrylic-based adhesive (SGA) which includes an acrylic-based compound, an oxidizer, and a reducer and in which a portion of the acrylic-based compound and the oxidizer are assigned to a first agent and the remaining portion of the acrylic-based compound and the reducer are assigned to a second agent. The adhesion parts are partially provided between the electrical steel sheets adjacent to each other in the stacking direction.

9 Claims, 4 Drawing Sheets

(58) Field of Classification Search
USPC .................. 310/216.004, 216.065, 216.067
See application file for complete search history.

(56) References Cited

U.S. PATENT DOCUMENTS

| | | | |
|---|---|---|---|
| 4,103,195 | A | 7/1978 | Torossian |
| 4,413,406 | A | 11/1983 | Bennett |
| 5,142,178 | A | 8/1992 | Kloster et al. |
| 5,248,405 | A | 9/1993 | Kaneda et al. |
| 5,338,996 | A | 8/1994 | Yamamoto |
| 5,448,119 | A | 9/1995 | Kono et al. |
| 5,994,464 | A | 11/1999 | Ohsawa et al. |
| 6,495,936 | B2 | 12/2002 | Kikuchi et al. |
| 6,653,758 | B2 | 11/2003 | Tsuneyoshi et al. |
| 7,298,064 | B2 | 11/2007 | Yamamoto |
| 7,562,439 | B2 | 7/2009 | Yamamoto |
| 7,859,163 | B2 | 12/2010 | Bertocchi et al. |
| 7,952,254 | B2 | 5/2011 | Cho et al. |
| 8,015,691 | B2 | 9/2011 | Miyake |
| 8,580,217 | B2 | 11/2013 | Hipszki et al. |
| 8,581,468 | B2 | 11/2013 | Kudose et al. |
| 8,697,811 | B2 | 4/2014 | Kishi et al. |
| 9,331,530 | B2 | 5/2016 | Jang et al. |
| 9,512,335 | B2 | 12/2016 | Hoshi et al. |
| 9,770,949 | B2 | 9/2017 | Fudemoto et al. |
| 10,340,754 | B2 | 7/2019 | Ogino et al. |
| 10,348,170 | B2 | 7/2019 | Izumi et al. |
| 10,476,321 | B2 | 11/2019 | Li et al. |
| 10,491,059 | B2 | 11/2019 | Murakami et al. |
| 10,547,225 | B2 | 1/2020 | Hattori et al. |
| 10,574,112 | B2 | 2/2020 | Tomonaga |
| 10,819,201 | B2 | 10/2020 | Thumm et al. |
| 10,840,749 | B2 | 11/2020 | Chaillou et al. |
| 11,056,934 | B2 | 7/2021 | Kubota et al. |
| 11,616,407 | B2 | 3/2023 | Hino et al. |
| 2002/0047459 | A1 | 4/2002 | Adaeda et al. |
| 2002/0163277 | A1 | 11/2002 | Miyake et al. |
| 2004/0056556 | A1 | 3/2004 | Fujita |
| 2004/0124733 | A1 | 7/2004 | Yamamoto et al. |
| 2006/0043820 | A1 | 3/2006 | Nakahara |
| 2007/0024148 | A1 | 2/2007 | Maita et al. |
| 2007/0040467 | A1 | 2/2007 | Gu |
| 2007/0182268 | A1 | 8/2007 | Hashiba et al. |
| 2009/0026873 | A1 | 1/2009 | Matsuo et al. |
| 2009/0195110 | A1 | 8/2009 | Miyaki |
| 2009/0230812 | A1 | 9/2009 | Cho et al. |
| 2010/0090560 | A1 | 4/2010 | Myojin |
| 2010/0197830 | A1 | 8/2010 | Hayakawa et al. |
| 2010/0219714 | A1 | 9/2010 | Abe et al. |
| 2010/0244617 | A1 | 9/2010 | Nobata et al. |
| 2011/0180216 | A1 | 7/2011 | Miyake |
| 2011/0269894 | A1 | 11/2011 | Miyamoto |
| 2012/0088096 | A1 | 4/2012 | Takeda et al. |
| 2012/0128926 | A1 | 5/2012 | Ohishi et al. |
| 2012/0156441 | A1 | 6/2012 | Gerster |
| 2012/0235535 | A1 | 9/2012 | Watanabe |
| 2012/0288659 | A1 | 11/2012 | Hoshi et al. |
| 2013/0244029 | A1 | 9/2013 | Igarashi et al. |
| 2014/0023825 | A1 | 1/2014 | Igarashi et al. |
| 2015/0028717 | A1 | 1/2015 | Luo et al. |
| 2015/0097463 | A1 | 4/2015 | Blocher et al. |
| 2015/0130318 | A1 | 5/2015 | Kitada et al. |
| 2015/0256037 | A1 | 9/2015 | Kudose |
| 2015/0337106 | A1 | 11/2015 | Kajihara |
| 2016/0023447 | A1 | 1/2016 | Shimizu |
| 2016/0352159 | A1 | 12/2016 | Li et al. |
| 2016/0352165 | A1 | 12/2016 | Fubuki |
| 2017/0117758 | A1 | 4/2017 | Nakagawa |
| 2017/0287625 | A1 | 10/2017 | Ito |
| 2017/0342519 | A1 | 11/2017 | Uesaka et al. |
| 2018/0030292 | A1 | 2/2018 | Gotou |
| 2018/0056629 | A1 | 3/2018 | Hamamura |
| 2018/0159389 | A1 | 6/2018 | Nishikawa |
| 2018/0212482 | A1 | 7/2018 | Nigo |
| 2018/0295678 | A1 | 10/2018 | Okazaki et al. |
| 2018/0309330 | A1 | 10/2018 | Ueda |
| 2018/0342925 | A1 | 11/2018 | Horii et al. |
| 2019/0010361 | A1 | 1/2019 | Hoshi |
| 2019/0040183 | A1 | 2/2019 | Yoshida et al. |
| 2020/0048499 | A1 | 2/2020 | Andou et al. |
| 2020/0099263 | A1 | 3/2020 | Hirosawa et al. |
| 2020/0186014 | A1 | 6/2020 | Kusuyama |
| 2021/0296975 | A1 | 9/2021 | Hino et al. |

FOREIGN PATENT DOCUMENTS

| | | |
|---|---|---|
| EP | 3562006 A1 | 10/2019 |
| FR | 2803126 A1 | 6/2001 |
| JP | 56-065326 A | 6/1981 |
| JP | 57-006427 A | 1/1982 |
| JP | 60-170681 A | 9/1985 |
| JP | 60-186834 A | 12/1985 |
| JP | 60-186834 U | 12/1985 |
| JP | 63-207639 A | 8/1988 |
| JP | 03-124247 A | 5/1991 |
| JP | 03-247683 A | 11/1991 |
| JP | 04-028743 A | 3/1992 |
| JP | 04-028743 U | 3/1992 |
| JP | 07-118620 A | 5/1995 |
| JP | 07-298567 A | 11/1995 |
| JP | 08-259899 A | 10/1996 |
| JP | 11-162724 A | 6/1999 |
| JP | 2000-050539 A | 2/2000 |
| JP | 2000-152570 A | 5/2000 |
| JP | 2001-115125 A | 4/2001 |
| JP | 2002-078257 A | 3/2002 |
| JP | 2002-088107 A | 3/2002 |
| JP | 2002-105283 A | 4/2002 |
| JP | 2002-125341 A | 4/2002 |
| JP | 2002-151335 A | 5/2002 |
| JP | 2002-151339 A | 5/2002 |
| JP | 2002-164224 A | 6/2002 |
| JP | 2002-332320 A | 11/2002 |
| JP | 2003-199303 A | 7/2003 |
| JP | 2003-206464 A | 7/2003 |
| JP | 2003-219585 A | 7/2003 |
| JP | 2003-264962 A | 9/2003 |
| JP | 2003284274 A | 10/2003 |
| JP | 2004-088970 A | 3/2004 |
| JP | 2004-111509 A | 4/2004 |
| JP | 2004-150859 A | 5/2004 |
| JP | 2005-019642 A | 1/2005 |
| JP | 2005-268589 A | 9/2005 |
| JP | 2005-269732 A | 9/2005 |
| JP | 2006-254530 A | 9/2006 |
| JP | 2006-288114 A | 10/2006 |
| JP | 2006-353001 A | 12/2006 |
| JP | 2007015302 A | 1/2007 |
| JP | 2007-039721 A | 2/2007 |
| JP | 2008-067459 A | 3/2008 |
| JP | 4143090 B | 9/2008 |
| JP | 2009072035 A | 4/2009 |
| JP | 2009-177895 A | 8/2009 |
| JP | 2010-004716 A | 1/2010 |
| JP | 2010081659 A | 4/2010 |
| JP | 2010-220324 A | 9/2010 |
| JP | 2010-259158 A | 11/2010 |
| JP | 2011-023523 A | 2/2011 |
| JP | 2011-195735 A | 10/2011 |

(56) References Cited

FOREIGN PATENT DOCUMENTS

| | | |
|---|---|---|
| JP | 2012029494 A | 2/2012 |
| JP | 2012-061820 A | 3/2012 |
| JP | 2012060773 A | 3/2012 |
| JP | 2012-120299 A | 6/2012 |
| JP | 2012196100 A | 10/2012 |
| JP | 2013-089883 A | 5/2013 |
| JP | 2013-181101 A | 9/2013 |
| JP | 2013-253153 A | 12/2013 |
| JP | 5423465 B2 | 2/2014 |
| JP | 2014-096429 A | 5/2014 |
| JP | 2014-155347 A | 8/2014 |
| JP | 2015-012756 A | 1/2015 |
| JP | 2015-082848 A | 4/2015 |
| JP | 2015-136228 A | 7/2015 |
| JP | 2015-142453 A | 8/2015 |
| JP | 2015-164389 A | 9/2015 |
| JP | 2015-171202 A | 9/2015 |
| JP | 2016-025317 A | 2/2016 |
| JP | 2016-046969 A | 4/2016 |
| JP | 2016-073109 A | 5/2016 |
| JP | 2016-140134 A | 8/2016 |
| JP | 2016-171652 A | 9/2016 |
| JP | 2016167907 A | 9/2016 |
| JP | 2016171652 A * | 9/2016 |
| JP | 2017-005906 A | 1/2017 |
| JP | 2017-011863 A | 1/2017 |
| JP | 2017-028911 A | 2/2017 |
| JP | 2017-046442 A | 3/2017 |
| JP | 2017-075279 A | 4/2017 |
| JP | 2017075279 A * | 4/2017 |
| JP | 2017-218596 A | 12/2017 |
| JP | 2018-038119 A | 3/2018 |
| JP | 2018-061319 A | 4/2018 |
| JP | 2018-078691 A | 5/2018 |
| JP | 2018-083930 A | 5/2018 |
| JP | 2018-093704 A | 6/2018 |
| JP | 2018-107852 A | 7/2018 |
| JP | 2018-138634 A | 9/2018 |
| JP | 2018-145492 A | 9/2018 |
| KR | 10-2018-0110157 A | 10/2018 |
| TW | 201809023 A | 3/2018 |
| WO | 2010/082482 A1 | 7/2010 |
| WO | 2011/013691 A1 | 2/2011 |
| WO | 2011/054065 A2 | 5/2011 |
| WO | 2014/102915 A1 | 7/2014 |
| WO | 2016017132 A1 | 2/2016 |
| WO | 2017/033229 A1 | 3/2017 |
| WO | 2017104479 A1 | 6/2017 |
| WO | 2017/170957 A | 10/2017 |
| WO | WO-2017170957 A1 * | 10/2017 | ............ C08F 2/44 |
| WO | 2017/199527 A1 | 11/2017 |
| WO | 2018/043429 A1 | 3/2018 |
| WO | 2018/093130 A1 | 5/2018 |
| WO | 2018/105473 A1 | 6/2018 |
| WO | WO-2018116585 A1 * | 6/2018 | ............ B21D 28/02 |
| WO | 2018/138864 A1 | 8/2018 |
| WO | 2018/207277 A1 | 11/2018 |
| WO | 2018/216565 A1 | 11/2018 |
| WO | 2020/129921 A1 | 6/2020 |
| WO | 2020/129923 A1 | 6/2020 |
| WO | 2020/129924 A1 | 6/2020 |
| WO | 2020/129925 A1 | 6/2020 |
| WO | 2020/129926 A1 | 6/2020 |
| WO | 2020/129927 A1 | 6/2020 |
| WO | 2020/129928 A1 | 6/2020 |
| WO | 2020/129929 A1 | 6/2020 |
| WO | 2020/129935 A1 | 6/2020 |
| WO | 2020/129936 A1 | 6/2020 |
| WO | 2020/129937 A1 | 6/2020 |
| WO | 2020/129938 A1 | 6/2020 |
| WO | 2020/129940 A1 | 6/2020 |
| WO | 2020/129941 A1 | 6/2020 |
| WO | 2020/129942 A1 | 6/2020 |
| WO | 2020/129948 A1 | 6/2020 |
| WO | 2020/129951 A1 | 6/2020 |

OTHER PUBLICATIONS

Datasheet of Nylon 6, Cast (Year: N/A, Printed Jun. 28, 2023).
Japanese Industrial Standard (JIS) C 2552: 2014, relevance discussed in specification.
Japanese Industrial Standard (JIS) C 2553: 2012, relevance discussed in specification.
Japanese Industrial Standard (JIS) R 1602: 1995, relevance discussed in specification.
Japanese Industrial Standard (JIS) Z 2241: 2011.
Japanese Industrial Standard (JIS) K 7252-1:2016.
Japanese Industrial Standard (JIS) K 7121-1987.
Japanese Industrial Standard (JIS) K 6850: 1999.
The papers of technical meetings in the Institute of Electrical Engineers of Japan,RM-92-79, 1992, relevance discussed in specification.

* cited by examiner

ADHESIVELY-LAMINATED CORE FOR STATOR, METHOD OF MANUFACTURING SAME, AND ELECTRIC MOTOR

TECHNICAL FIELD

The present invention relates to an adhesively-laminated core for a stator, a method of manufacturing the same, and an electric motor.

Priority is claimed on Japanese Patent Application No. 2018-235869, filed Dec. 17, 2018, the content of which is incorporated herein by reference.

BACKGROUND ART

In the related art, regarding cores used in an electric motor, laminated cores in which a plurality of electrical steel sheets are stacked on one another are known. The plurality of steel sheets are bonded by a method of welding, adhesion, fastening, or the like.

Patent Document 1 discloses a technology in which a two-component curing type adhesive is used in a step of stacking a plurality of rotor steel sheets constituting a rotor core.

CITATION LIST

Patent Document

[Patent Document 1]
Japanese Unexamined Patent Application, First Publication No. 2017-046442

SUMMARY OF THE INVENTION

Problems to be Solved by the Invention

However, an iron loss of an electric motor cannot be sufficiently suppressed with a rotor core obtained by the technology in Patent Document 1.

The present invention provides an adhesively-laminated core for a stator capable of suppressing an iron loss of an electric motor and also having excellent productivity, a method of manufacturing the same, and an electric motor including the adhesively-laminated core for a stator.

Means for Solving the Problem

An embodiment of the present invention has the following aspects.

[1] There is provided an adhesively-laminated core for a stator including a plurality of electrical steel sheets which are stacked on one another and of which both surfaces are coated with insulation coatings, and adhesion parts which are disposed between the electrical steel sheets adjacent to each other in a stacking direction and cause the electrical steel sheets to be adhered to each other. All sets of the electrical steel sheets adjacent to each other in the stacking direction are adhered via the adhesion parts. An adhesive forming the adhesion parts is a two-agent type acrylic-based adhesive which includes an acrylic-based compound, an oxidizer, and a reducer, and in which a portion of the acrylic-based compound and the oxidizer are assigned to a first agent and the remaining portion of the acrylic-based compound and the reducer are assigned to a second agent. The adhesion parts are partially provided between the electrical steel sheets adjacent to each other in the stacking direction.

[2] In the adhesively-laminated core for a stator according to the [1], the acrylic-based compound includes at least one selected from the group consisting of methyl methacrylate, phenoxyethyl methacrylate, 2-hydroxyethyl methacrylate, and 2-hydroxypropyl methacrylate. The methyl methacrylate is within a range of 0 to 50 mass %, the phenoxyethyl methacrylate is within a range of 0 to 50 mass %, the 2-hydroxyethyl methacrylate is within a range of 0 to 50 mass %, and the 2-hydroxypropyl methacrylate is within a range of 0 to 50 mass % with respect to a total mass of the acrylic-based adhesive.

[3] There is provided an adhesively-laminated core for a stator including a plurality of electrical steel sheets which are stacked on one another and of which both surfaces are coated with insulation coatings, and adhesion parts which are disposed between the electrical steel sheets adjacent to each other in a stacking direction and cause the electrical steel sheets to be adhered to each other. All sets of the electrical steel sheets adjacent to each other in the stacking direction are adhered via the adhesion parts. An adhesive forming the adhesion parts is an acrylic-based adhesive which includes an acrylic-based compound. The adhesion parts are partially provided between the electrical steel sheets adjacent to each other in the stacking direction.

[4] In the adhesively-laminated core for a stator according to the [3], the acrylic-based adhesive is an anaerobic adhesive.

[5] In the adhesively-laminated core for a stator according to the [3], the acrylic-based compound is cyanoacrylate.

[6] In the adhesively-laminated core for a stator according to any one of the [1] to [5], the acrylic-based adhesive further includes an elastomer.

[7] In the adhesively-laminated core for a stator according to the [6], the elastomer includes acrylonitrile butadiene rubber. The acrylonitrile butadiene rubber is within a range of 1 to 20 mass % with respect to a total mass of the acrylic-based adhesive.

[8] In the adhesively-laminated core for a stator according to any one of the [1] to [7], an adhesion area ratio of the electrical steel sheets via the adhesion parts is within a range of 20% to 80% between the electrical steel sheets.

[9] A method of manufacturing the adhesively-laminated core for a stator according to the [1] including repeating an operation of forming the adhesion part at room temperature by coating a portion on a surface of the electrical steel sheet with the first agent and the second agent of the acrylic-based adhesive and then press-stacking the electrical steel sheet over another electrical steel sheet.

[10] A method of manufacturing the adhesively-laminated core for a stator according to the [3] including repeating an operation of forming the adhesion part at room temperature by coating a portion on a surface of the electrical steel sheet with the acrylic-based adhesive and then press-stacking the electrical steel sheet over another electrical steel sheet.

[11] An electric motor including the adhesively-laminated core for a stator according to any one of the [1] to [8].

Effects of the Invention

According to the present invention, it is possible to provide an adhesively-laminated core for a stator capable of suppressing an iron loss of an electric motor and also having excellent productivity, a method of manufacturing the same, and an electric motor including the adhesively-laminated core for a stator.

EMBODIMENTS FOR IMPLEMENTING THE INVENTION

Hereinafter, with reference to the drawings, an adhesively-laminated core for a stator according to an embodiment of the present invention and an electric motor including this adhesively-laminated core for a stator will be described. In the present embodiment, a motor, specifically an AC motor, more specifically a synchronous motor, further specifically a permanent magnetic electric motor will be described as an example of an electric motor. For example, motors of these kinds are favorably employed in electric automobiles and the like.

First Embodiment

Figure 1:
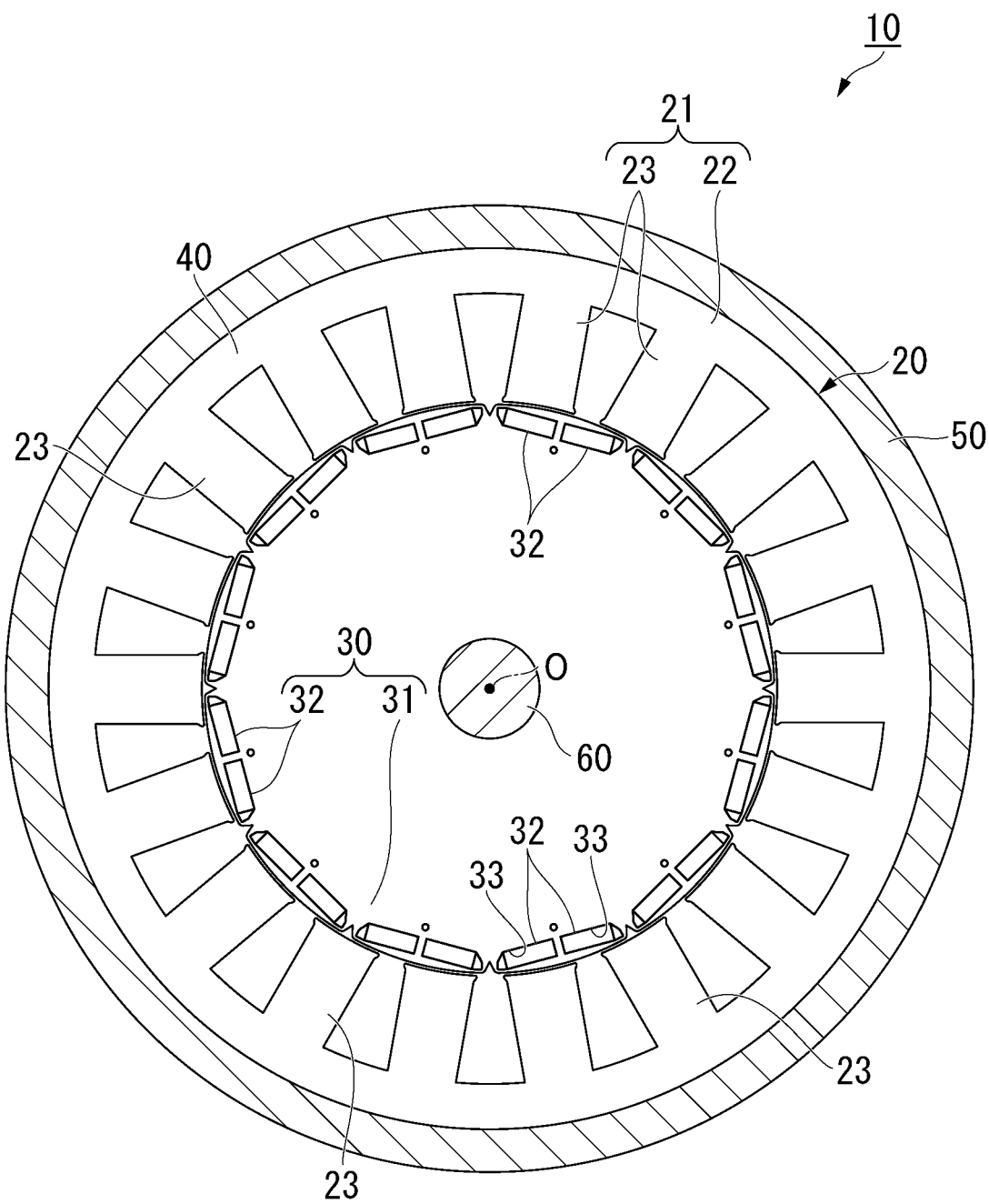
FIG. 1 is a cross-sectional view of an electric motor including an adhesively-laminated core for a stator according to an embodiment of the present invention.

As illustrated in FIG. 1, an electric motor 10 includes a stator 20, a rotor 30, a casing 50, and a rotary shaft 60. The stator 20 and the rotor 30 are accommodated inside the casing 50. The stator 20 is fixed to the inside of the casing 50.

In the present embodiment, an inner rotor type motor in which the rotor 30 is positioned inside the stator 20 in a radial direction is employed as the electric motor 10. However, an outer rotor type motor in which the rotor 30 is positioned outside the stator 20 may be employed as the electric motor 10. In addition, in the present embodiment, the electric motor 10 is a three-phase AC motor having 12 poles and 18 slots. However, the number of poles, the number of slots, the number of phases, and the like can be suitably changed.

For example, the electric motor 10 can be rotated at a rotation speed of 1,000 rpm by applying an excitation current having an effective value of 10 A and a frequency of 100 Hz to each phase.

The stator 20 includes an adhesively-laminated core for a stator (hereinafter, a stator core) 21 and a winding (not illustrated).

The stator core 21 includes an annular core back part 22 and a plurality of tooth parts 23. Hereinafter, a direction of a center axis O of the stator core 21 (or the core back part 22) will be referred to as an axial direction. A radial direction (a direction orthogonal to the center axis O) of the stator core 21 (or the core back part 22) will be referred to as a radial direction. A circumferential direction (a direction of rotation around the center axis O) of the stator core 21 (or the core back part 22) will be referred to as a circumferential direction.

The core back part 22 is formed to have a circular shape in a plan view in which the stator 20 is viewed in the axial direction.

The plurality of tooth parts 23 protrude inward in the radial direction (toward the center axis O of the core back part 22 in the radial direction) from an inner circumference of the core back part 22. The plurality of tooth parts 23 are disposed at equal angular intervals in the circumferential direction. In the present embodiment, 18 tooth parts 23 are provided every 20 degrees with respect to a central angle centering on the center axis O. The plurality of tooth parts 23 are formed to have shapes and sizes equivalent to each other. Thus, the plurality of tooth parts 23 have the same thickness dimension as each other.

The winding is wound around the tooth parts 23. The winding may be subjected to concentrated winding or may be subjected to distributed winding.

The rotor 30 is disposed on an inward side in the radial direction with respect to the stator 20 (the stator core 21). The rotor 30 includes a rotor core 31 and a plurality of permanent magnets 32.

The rotor core 31 is formed to have an annular shape (a circular shape) coaxially disposed with the stator 20. The rotary shaft 60 is disposed inside the rotor core 31. The rotary shaft 60 is fixed to the rotor core 31.

The plurality of permanent magnets 32 are fixed to the rotor core 31. In the present embodiment, two permanent magnets 32 in one set form one magnetic pole. The permanent magnets 32 of a plurality of sets are disposed at equal angular intervals in the circumferential direction. In the present embodiment, 12 sets of the permanent magnets 32 of (24 in total) are provided every 30 degrees with respect to the central angle centering on the center axis O.

In the present embodiment, an interior permanent magnet motor is employed as a permanent magnetic electric motor. A plurality of penetration holes 33 penetrating the rotor core 31 in the axial direction are formed in the rotor core 31. The plurality of penetration holes 33 are provided in a manner of corresponding to disposition of the plurality of permanent magnets 32. Each of the permanent magnets 32 is fixed to the rotor core 31 in a state of being disposed inside the corresponding penetration hole 33. For example, fixing of each of the permanent magnets 32 to the rotor core 31 can be realized through adhesion or the like between outer surfaces of the permanent magnets 32 and inner surfaces of the penetration holes 33 using an adhesive. A surface permanent magnet motor may be employed as a permanent magnetic electric motor in place of an interior permanent magnet motor.

Figure 2:
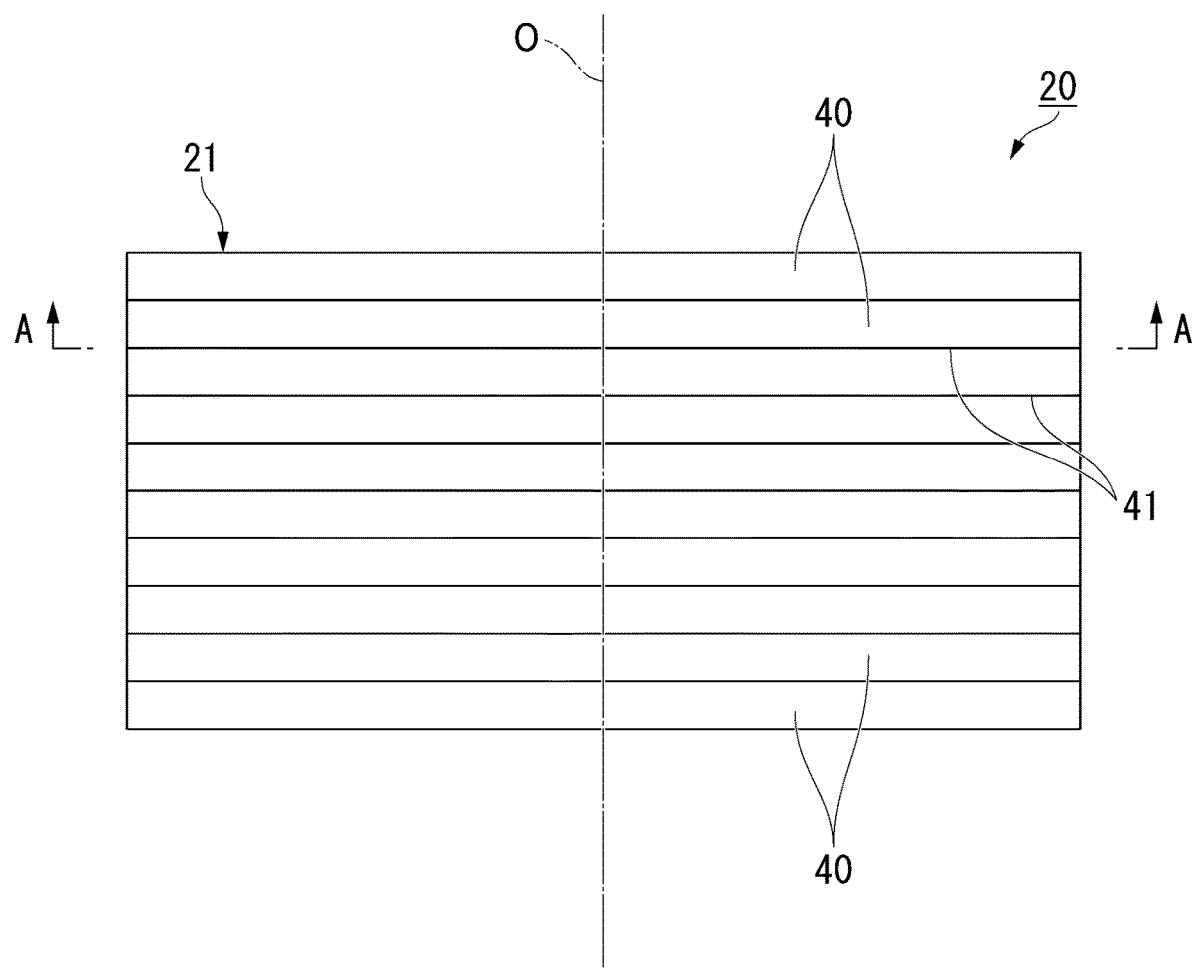
FIG. 2 is a side view of the same laminated core for a stator.

Both the stator core 21 and the rotor core 31 are laminated cores. For example, as illustrated in FIG. 2, the stator core 21 is formed by stacking a plurality of electrical steel sheets 40.

A stacking thickness (an overall length along the center axis O) of each of the stator core 21 and the rotor core 31 is set to 50.0 mm, for example. An outer diameter of the stator core 21 is set to 250.0 mm, for example. An inner diameter of the stator core 21 is set to 165.0 mm, for example. An outer diameter of the rotor core 31 is set to 163.0 mm, for example. An inner diameter of the rotor core 31 is set to 30.0 mm, for example. However, these values are examples, and the stacking thickness, the outer diameter, and the inner diameter of the stator core 21 and the stacking thickness, the outer diameter, and the inner diameter of the rotor core 31 are not limited to these values. Here, the inner diameter of the stator core 21 is based on tip parts of the tooth parts 23 in the stator core 21. That is, the inner diameter of the stator core 21 is a diameter of an imaginary circle inscribed in the tip parts of all the tooth parts 23.

For example, each of the electrical steel sheets 40 forming the stator core 21 and the rotor core 31 is formed by performing punching or the like of an electrical steel sheet (base material). Known electrical steel sheets can be used as the electrical steel sheets 40. A chemical composition of the electrical steel sheets 40 is not particularly limited. In the present embodiment, non-grain-oriented electrical steel sheets are employed as the electrical steel sheets 40. For example, non-grain-oriented electrical steel strips of JIS C 2552:2014 can be employed as non-grain-oriented electrical steel sheets.

However, grain-oriented electrical steel sheets can also be employed as the electrical steel sheets 40 in place of non-grain-oriented electrical steel sheets. For example, grain-oriented electrical steel strips of JIS C 2553:2012 can be employed as grain-oriented electrical steel sheets.

In order to improve the workability of the electrical steel sheets and an iron loss of the laminated core, both surfaces of the electrical steel sheets 40 are coated with an insulation coating. For example, (1) an inorganic compound, (2) an organic resin, (3) a mixture of an inorganic compound and an organic resin, or the like can be employed as a substance constituting the insulation coating. Examples of an inorganic compound include (1) a complex of dichromate and boric acid, and (2) a complex of phosphate and silica. Examples of an organic resin include an epoxy resin, an acrylic resin, an acrylic styrene resin, a polyester resin, a silicone resin, and a fluorine resin.

In order to ensure insulating performance between the electrical steel sheets 40 stacked on one another, it is preferable that a thickness of the insulation coating (an average thickness for one surface of the electrical steel sheet 40) be 0.1 µm or more.

On the other hand, an insulating effect becomes saturated when the insulation coating becomes thicker. In addition, a ratio (space factor) of the electrical steel sheet to the laminated core decreases and a performance of a laminated core deteriorates as the insulation coating becomes thicker. Therefore, it is better for the insulation coating to be thin to an extent that the insulating performance can be ensured. The thickness of the insulation coating (thickness for one surface of the electrical steel sheet 40) is preferably within a range of 0.1 µm to 5 µm and more preferably within a range of 0.1 µm to 2 µm.

An effect of achieving the betterment in an iron loss gradually becomes saturated as the sheet thicknesses of the electrical steel sheets 40 become thinner. In addition, manufacturing costs of the electrical steel sheets 40 increase as the electrical steel sheets 40 become thinner. For this reason, in consideration of the effect of achieving the betterment in an iron loss and the manufacturing costs, it is preferable that the thicknesses of the electrical steel sheets 40 be 0.10 mm or more.

On the other hand, if the electrical steel sheets 40 are excessively thick, it is difficult to perform press punching work of the electrical steel sheets 40. For this reason, in consideration of press punching work of the electrical steel sheets 40, it is preferable that the thicknesses of the electrical steel sheets 40 be 0.65 mm or smaller.

In addition, if the electrical steel sheets 40 become thick, an iron loss increases. For this reason, in consideration of iron loss characteristics of the electrical steel sheets 40, the thicknesses of the electrical steel sheets 40 are preferably 0.35 mm or less and more preferably 0.20 mm or 0.25 mm.

In consideration of the foregoing points, for example, the thickness of each of the electrical steel sheets 40 is within a range of 0.10 mm to 0.65 mm, preferably within a range of 0.10 mm to 0.35 mm, and more preferably 0.20 mm or 0.25 mm. The thicknesses of the electrical steel sheets 40 also include the thicknesses of the insulation coatings.

As illustrated in FIG. 2, in the stator core 21, adhesion parts 41 causing these electrical steel sheets 40 to be adhered to each other are partially provided between all sets of the electrical steel sheets 40 adjacent to each other in a stacking direction. All sets of the electrical steel sheets 40 adjacent to each other in the stacking direction are stacked via the adhesion parts 41 partially provided therebetween. The electrical steel sheets 40 adjacent to each other in the stacking direction are not fixed by other methods (for example, fastening).

The adhesion parts 41 cause the electrical steel sheets 40 adjacent to each other in the stacking direction to be adhered. The adhesion parts 41 are adhesives cured without being divided.

In order to stably obtain a sufficient adhesion strength, it is preferable that the thicknesses of the adhesion parts 41 be 1 µm or larger.

On the other hand, if the thicknesses of the adhesion parts 41 exceed 100 µm, an adhesion force becomes saturated. In addition, the space factor decreases as the adhesion parts 41 become thicker, and magnetic properties such as an iron loss of the stator core decreases. Therefore, the thicknesses of the adhesion parts 41 are preferably within a range of 1 µm to 100 µm and more preferably within a range of 1 µm to 10 µm.

In the foregoing description, the thicknesses of the adhesion parts 41 denote the average thickness of the adhesion parts 41. For example, the average thickness of the adhesion parts 41 can be adjusted by varying the amount of coating the adhesive.

The average thickness of the adhesion parts 41 are an average value of the entire laminated core. The average thickness of the adhesion parts 41 seldom varies at stacking positions in the stacking direction thereof or at positions in the circumferential direction around the center axis of the laminated core. For this reason, the value of the average thickness of the adhesion parts 41 can be the average value of numerical values measured at ten or more places at an upper end position in the laminated core in the circumferential direction.

An adhesive forming the adhesion parts 41 is a second generation acrylic adhesive (SGA). It can be said that the adhesion parts 41 are formed of a cured product of an SGA.

The SGA includes an acrylic-based compound, an oxidizer, and a reducer.

The SGA in the present embodiment is a two-agent type adhesive and is constituted of two agents, such as a first agent and a second agent. In addition, in the components described above, a portion of the acrylic-based compound and the oxidizer are assigned to the first agent, and the remaining portion of the acrylic-based compound and the reducer are assigned to the second agent. When the first agent and the second agent come into contact with each other, polymerization of the acrylic-based compound proceeds due to redox reaction, and the acrylic-based compound is cured.

Since curing of a two-agent type SGA quickly proceeds at room temperature (for example, 20° C. to 30° C., and specifically 20° C. to 25° C.), when the adhesion parts 41 are formed, there is no need to perform heating treatment in the case of a thermosetting adhesive, and curing treatment such as long-time retention at the time of natural curing, and thus the stator core 21 can be manufactured with excellent productivity. The SGA will be described below in detail.

Generally, when an adhesive is cured, curing shrinkage occurs. Due to this curing shrinkage, compressive stress or tensile stress is applied to the electrical steel sheets 40. When such stress is applied to the electrical steel sheets 40, strain occurs. Particularly, in the case of a thermosetting type adhesive, greater stress is applied due to a difference between thermal expansion coefficients of the electrical steel sheets 40 and the adhesion parts. Strain of the electrical steel sheets 40 increases an iron loss of the electric motor 10. An influence of strain of the electrical steel sheets 40 constituting the stator core 21 on an iron loss is greater than an influence of strain of the steel sheet constituting the rotor core 31.

In the present embodiment, since the adhesion parts 41 are partially provided, compared to a case in which the adhesion parts 41 are provided on the entire surface, stress applied to the electrical steel sheets 40 due to curing shrinkage is reduced. In addition, since a two-agent type SGA is cured at room temperature, stress due to the difference between the thermal expansion coefficients is also reduced. For this reason, strain of the electrical steel sheets 40 can be suppressed, and increase in iron loss can be suppressed.

The adhesion parts 41 are partially provided between the electrical steel sheets 40 adjacent to each other in the stacking direction. Namely, an adhesion region 42 and a non-adhesion region 43 are formed on a surface (first surface) directed in the stacking direction in the electrical steel sheets 40. The adhesion region 42 is a region in which the adhesion parts 41 are provided on the first surface of the electrical steel sheets 40, that is, a region in which an adhesive cured without being divided is provided on the first surface of the electrical steel sheets 40. The non-adhesion region 43 is a region in which the adhesion parts 41 are not provided on the first surface of the electrical steel sheets 40, that is, a region in which an adhesive cured without being divided is not provided on the first surface of the electrical steel sheets 40. In the stator core 21, it is preferable that the adhesion parts 41 be partially provided between the core back parts 22 and also be partially provided between the tooth parts 23 between the electrical steel sheets 40 adjacent to each other in the stacking direction.

Typically, the adhesion parts 41 are disposed at a plurality of places in a dispersed manner between all sets of the electrical steel sheets 40 adjacent to each other in the stacking direction. That is, typically, all sets of the electrical steel sheets 40 adjacent to each other in the stacking direction are stacked via a plurality of adhesion parts 41 provided therebetween.

Figure 3:
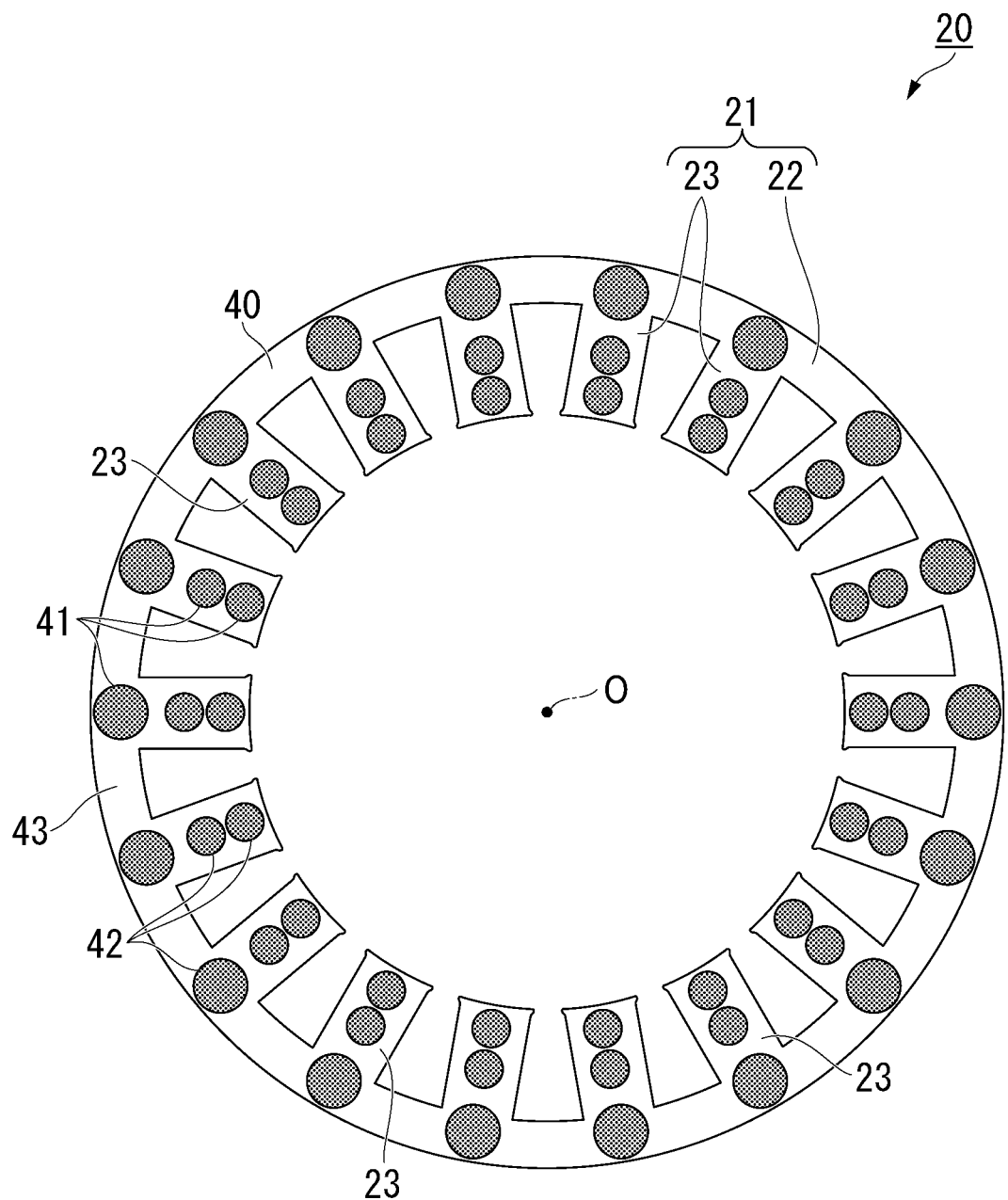
FIG. 3 is a cross-sectional view along A-A in FIG. 2 and is a view illustrating an example of a disposition pattern of adhesion parts in the same adhesively-laminated core for a stator.

FIG. 3 illustrates an example of a disposition pattern of the adhesion parts 41. In this example, each of the plurality of adhesion parts 41 is formed to have a circular dot shape. More specifically, in the core back part 22, the plurality of adhesion parts 41 are formed to have dot shapes having an average diameter of 12 mm at equal angular intervals in the circumferential direction thereof. In each of the tooth parts 23, the plurality of adhesion parts 41 are formed to have dot shapes having an average diameter of 8 mm in the radial direction.

The average diameters described herein are examples. The average diameter of the dot-shaped adhesion parts 41 in the core back part 22 can be suitably selected within a range of 2 mm to 20 mm, for example. The average diameter of the dot-shaped adhesion parts 41 in each of the tooth parts 23 can be suitably selected within a range of 2 mm to 15 mm, for example. In addition, the formation pattern in FIG. 3 is an example, and the number, the shape, and the disposition of adhesion parts 41 provided between the electrical steel sheets 40 can be suitably changed as necessary.

The average diameter is obtained by measuring diameters of adhesive marks of the adhesion parts 41 using a ruler after peeling the electrical steel sheets 40 from each other. When the shapes of the adhesive marks in a plan view are not perfect circles, the diameters are diameters of circumscribed circles (perfect circles) of the adhesive marks in a plan view.

In this specification, the preposition "to" indicating a numerical value range denotes that numerical values in front of and behind it are included as a lower limit value and an upper limit value therefor.

An adhesion area ratio of the electrical steel sheets 40 via the adhesion parts 41 is preferably within a range of 20% to 80%, more preferably within a range of 30% to 75%, and further preferably within a range of 40% to 70% between the electrical steel sheets 40. If the adhesion area ratio of the electrical steel sheets 40 is equal to or more than the lower limit value of the range, the electrical steel sheets 40 adjacent to each other in the stacking direction can be adhered to each other with a sufficient adhesion strength, and thus an excellent core rigidity is achieved. If the adhesion area ratio of the electrical steel sheets 40 is equal to or less than the upper limit value of the range, a more excellent effect of suppressing a core loss is achieved.

The adhesion area ratio of the electrical steel sheets 40 is an area ratio of a region of the adhesion parts 41 (the adhesion region 42) on the first surface of the electrical steel sheets 40 to the surface area of the first surface of the electrical steel sheets 40.

In terms of a balance between an adhesion strength and an effect of suppressing an iron loss, an adhesion area ratio of the core back part 22 via the adhesion parts 41 is preferably within a range of 50% to 80%, more preferably within a range of 60% to 80%, and further preferably within a range of 70% to 80%.

The adhesion area ratio of the core back part 22 is an area ratio of a region of the adhesion parts 41 (the adhesion region 42) on the first surface of the core back part 22 to the surface area of the first surface of the core back part 22 of the electrical steel sheets 40.

In terms of a balance between an adhesion strength and an effect of suppressing an iron loss, an adhesion area ratio of the tooth parts 23 via the adhesion parts 41 is preferably within a range of 20% to 50%, more preferably within a range of 20% to 40%, and further preferably within a range of 20% to 30%.

The adhesion area ratio of the tooth parts 23 is an area ratio of a region of the adhesion parts 41 (the adhesion region 42) on the first surface of the tooth parts 23 to the surface area of the first surface of the tooth parts 23 of the electrical steel sheets 40.

In the present embodiment, a plurality of electrical steel sheets on a side forming the rotor core 31 are fixed to each other using a fastening (dowel). However, similar to the stator core 21, a plurality of electrical steel sheets forming the rotor core 31 may also have a stacked structure fixed using an adhesive.

In addition, a laminated core such as the stator core 21 or the rotor core 31 may be formed by so-called rotationally stacking.

(SGA)

As described above, an SGA includes an acrylic-based compound, an oxidizer, and a reducer. In addition, the SGA in the present embodiment is a two-agent type adhesive and is constituted of two agents, such as a first agent and a second agent. In the components described above, a portion of the acrylic-based compound and the oxidizer are assigned to the first agent, and the remaining portion of the acrylic-based compound and the reducer assigned to the second agent. All the oxidizers are assigned to the first agent and are not assigned to the second agent. All the reducers are assigned to the second agent, and no reducer is assigned to the first agent.

The acrylic-based compound is a compound having a substituted or unsubstituted acryloyl group. Examples of a substituted or unsubstituted acryloyl group include a group expressed by $CH_2=C(R)CO-$ (R indicates hydrogen atoms, a methyl group, or an ethyl group).

Examples of an acrylic-based compound include an acrylic-based monomer, an acrylic-based oligomer, and an acrylic-based macromonomer.

Examples of an acrylic-based monomer include (meth) acrylate such as (meth)acrylic acid, methyl (meth)acrylate, cyclohexyl (meth)acrylate, benzyl (meth)acrylate, tetrahydrofurfuryl (meth)acrylate, glycerol (meth)acrylate, phenoxyethyl (meth)acrylate, 2-hydroxyethyl (meth)acrylate, and 2-hydroxypropyl (meth)acrylate; and 2,2-bis(4-methacryloxyphenyl) propane, 2,2-bis(4-methacrylokidiethoxyphenyl) propane, 2,2-bis(4-methacryloxypropoxyphenyl) propane, trimethylolpropane tri(meth)acrylate, pentaerythritol tetra(tri)acrylate, and dipentaerythritol hexa(meth)acrylate.

Examples of an acrylic-based oligomer include reactants of the foregoing acrylic-based monomer, nonylphenol ethylene oxide (EO) modified acrylate, bisphenol AEO modified diacrylate, isocyanuric acid EO modified diacrylate and triacrylate, trimethylolpropane EO modified triacrylate, a polybasic acid modified acrylic oligomer, urethane acrylate, and polyester acrylate.

Among these acrylic-based compounds, any one may be used alone or two or more may be used in a combination.

In terms of a curing time and handling properties, it is preferable that the acrylic-based compound be at least one selected from the group consisting of methyl methacrylate, phenoxyethyl methacrylate, 2-hydroxyethyl methacrylate, and 2-hydroxypropyl methacrylate.

The amount of an acrylic-based compound in the SGA is preferably within a range of 20 to 70 mass % and more preferably within a range of 30 to 60 mass % with respect to the total mass of the SGA. If the amount of an acrylic-based compound is within the range, a more excellent adhesion strength is achieved.

In the acrylic-based compound, the amount of methyl methacrylate is preferably within a range of 0 to 50 mass % and more preferably within a range of 20 to 40 mass % with respect to the total mass of the SGA. The amount of phenoxyethyl methacrylate is preferably within a range of 0 to 50 mass % and more preferably within a range of 10 to 30 mass % with respect to the total mass of the SGA. The amount of 2-hydroxyethyl methacrylate is preferably within a range of 0 to 50 mass % and more preferably within a range of 0 to 20 mass % with respect to the total mass of the SGA. The amount of 2-hydroxypropyl methacrylate is preferably within a range of 0 to 50 mass % and more preferably within a range of 0 to 20 mass % with respect to the total mass of the SGA. If the amount of each compound is equal to or less than the upper limit value of the range, favorable handling properties are achieved.

Among those above, if at least one selected from the group consisting of 2-hydroxyethyl methacrylate and 2-hydroxypropyl methacrylate is included, a three-dimensional structure is formed at the time of curing, and thus an average tensile modulus of elasticity increases.

It is preferable that the amount of at least one selected from the group consisting of 2-hydroxyethyl methacrylate and 2-hydroxypropyl methacrylate be within a range of 10 to 70 mass % with respect to the total mass of the acrylic-based compound.

The ratio of the acrylic-based compound in the first agent to the entire amount of an acrylic-based compound in the SGA is within a range of 50 to 90 mass %, for example.

When the SGA includes two or more acrylic-based compounds, the composition of the acrylic-based compound in the first agent and the composition of the acrylic-based compound in the second agent may be the same as or different from each other.

Examples of an oxidizer include organic peroxide such as cumene hydroperoxide, benzoyl peroxide, and tertiary butyl peroxybenzoate. Among these oxidizers, any one may be used alone or two or more may be used in a combination.

The amount of the oxidizer in the SGA is preferably within a range of 0.5 to 10 parts by mass and more preferably within a range of 1 to 7 parts by mass with respect to 100 parts by mass of the acrylic-based compound. If the amount of the oxidizer is equal to or more than the lower limit value of the range, a more excellent curing rate is achieved. If the amount of the oxidizer is equal to or less than the upper limit value of the range, more excellent storage stability is achieved.

Examples of a reducer include a thiourea compound such as emethylthiourea and tetramethylthiourea; a metal complex such as cobalt naphthenate, copper naphthenate, and vanadyl acetyl acetate; and tertiary amine such as trimethylamine, tributylamine, and N,N-dimethylparatoluidine. Among these reducers, any one may be used alone or two or more may be used in a combination.

The amount of the reducer in the SGA is preferably within a range of 0.01 to 5 parts by mass and more preferably within a range of 0.05 to 1 part by mass with respect to 100 parts by mass of the acrylic-based compound. If the amount of the reducer is equal to or more than the lower limit value of the range, a more excellent curing rate is achieved. If the amount of the reducer is equal to or less than the upper limit value of the range, more excellent storage stability is achieved.

It is preferable that the SGA further include an elastomer.

An elastomer contributes to improvement in viscosity, flowing characteristics, and elasticity.

When the SGA includes an elastomer, the elastomer may be assigned to the first agent, may be assigned to the second agent, or may be assigned to both the agents.

Examples of an elastomer include acrylonitrile butadiene rubber (NBR), a methyl methacrylate-butadiene-styrene copolymer (MBS), chlorosulfonated polyethylene, polybutadiene rubber, and polymethyl methacrylate. Among these elastomers, any one may be used alone or two or more may be used in a combination.

In terms of elasticity of a cured product, it is preferable that the elastomer be NBR.

When the SGA includes an elastomer, although the amount of the elastomer varies depending on the kind and the molecular weight of the elastomer, it is within a range of 1 to 30 mass % with respect to the total mass of the SGA, for example.

When the elastomer includes NBR, the amount of NBR is preferably within a range of 1 to 20 mass % and more preferably within a range of 5 to 15 mass % with respect to the total mass of the SGA. If the amount of NBR is equal to or more than the lower limit value of the range, a more excellent adhesion strength is achieved. If the amount of NBR is equal to or less than the upper limit value of the range, a more excellent curing rate is achieved.

As necessary, the SGA can include a solvent such as acetone or toluene. When the SGA includes a solvent, the solvent may be assigned to the first agent, may be assigned to the second agent, or may be assigned to both the agents.

As necessary, the SGA can further include other components. When the SGA includes other components, other components may be assigned to the first agent, may be assigned to the second agent, or may be assigned to both the agents.

Examples of other components include alkyl acid phosphate such as monomethyl phosphate and diphenyl phosphate, photoinitiators such as benzophenone and benzyl dimethyl ketal, and paraffins such as fine powder silica, paraffin, carnauba wax, and lanolin.

For example, the amount of other components in the SGA is within a range of 0 to 10 mass % with respect to the total mass of the SGA.

The average tensile modulus of elasticity of a cured product of the SGA at room temperature (20° C. to 30° C.) is preferably within a range of 1,500 to 5,000 MPa and more preferably within a range of 1,500 to 4,000 MPa. If the average tensile modulus of elasticity of a cured product, that is, the average tensile modulus of elasticity of the adhesion parts 41 is equal to or more than the lower limit value of the range, excellent iron loss characteristics of the laminated core are achieved. If the average tensile modulus of elasticity of a cured product is equal to or less than the upper limit value of the range, an excellent bonding strength of the laminated core is achieved.

The average tensile modulus of elasticity of a cured product of the SGA is measured by producing samples for measurement using a resonance method. Specifically, samples are obtained by causing two electrical steel sheets 40 to be adhered to each other using an adhesive (SGA) (measurement target), curing the adhesive, and forming the adhesion parts 41. The average tensile modulus of elasticity regarding the samples is measured by a resonance method in conformity to JIS R 1602:1995. Thereafter, the average tensile modulus of elasticity of the adhesion parts 41 alone is obtained by excluding the influence of the electrical steel sheets 40 themselves from the average tensile modulus of elasticity (measurement value) of the samples through calculation.

The tensile modulus of elasticity obtained from the samples in this manner is equivalent to an average value in the entire laminated core, and thus this numerical value is regarded as the average tensile modulus of elasticity. The composition is set such that the average tensile modulus of elasticity seldom varies at stacking positions in the stacking direction thereof or at positions in the circumferential direction around the center axis of the laminated core. For this reason, the value of the average tensile modulus of elasticity can also be a numerical value obtained by measuring the cured adhesion part 41 at an upper end position in the laminated core.

The average tensile modulus of elasticity of a cured product of the SGA can be adjusted depending on the kind, the physical characteristics, the molecular weight, the added amount, or the like of the elastomer. For example, if the molecular weight of the elastomer is reduced, the average tensile modulus of elasticity tends to increase.

Generally, regarding SGAs, two-agent type adhesives and one-agent type adhesives are known. Regarding two-agent type SGCs, two-main-agent type adhesives in which an acrylic-based compound is assigned to both the first agent and the second agent as described above, and primer type adhesives in which an acrylic-based compound is assigned to only one of the first agent and the second agent (adhesives in which an acrylic-based compound and an oxidizer are assigned to the first agent and a reducer is assigned to the second agent, and adhesives in which an acrylic-based compound and a reducer are assigned to the first agent and an oxidizer is assigned to the second agent) are known.

A one-agent type SGA requires heating to be cured. In contrast, a two-agent type SGA can be cured at room temperature. In addition, the mixed ratio in an SGA of a two-main-agent type may not be strictly adjusted compared to that in an SGA of a primer type.

In addition, generally, regarding adhesives which can be cured at room temperature, in addition to two-agent type SGAs, two-agent type epoxy-based adhesives, anaerobic adhesives, cyanoacrylate-based adhesives, and the like are known.

Although two-agent type SGAs have a high curing rate, the amount of applied stress can be reduced, and thus two-agent type SGAs are superior to other adhesives which can be cured at room temperature in terms of suppressing an iron loss.

(Method of Manufacturing Stator Core)

For example, the stator core 21 can be manufactured by repeating an operation of forming the adhesion part 41 at room temperature by partially coating a portion on a surface of the electrical steel sheet 40 with a first agent and a second agent of an SGA and then press-stacking the electrical steel sheet 40 over another electrical steel sheet 40.

When the coated first and second agents come into contact with each other, curing of the SGA proceeds at room temperature, and thus the adhesion part 41 is formed. Typically, the same position on the surface of the electrical steel sheet 40 is coated with the first agent and the second agent. Either the first agent or the second agent may coat the surface first.

Hereinafter, a method of manufacturing the stator core 21 will be described using a manufacturing apparatus 100 illustrated in FIG. 4.

First of all, the manufacturing apparatus 100 will be described. In this manufacturing apparatus 100, while an electrical steel sheet P is sent out in an arrow F direction from a coil C (hoop), punching is performed a plurality of times by molds disposed in respective stages, and it is gradually formed to have a shape of the electrical steel sheet 40. Positions corresponding to lower surfaces of a second electrical steel sheet 40 and thereafter are coated with the first agent and the second agent of the SGA, and the punched electrical steel sheets 40 are sequentially stacked and subjected to press-stacking.

Figure 4:
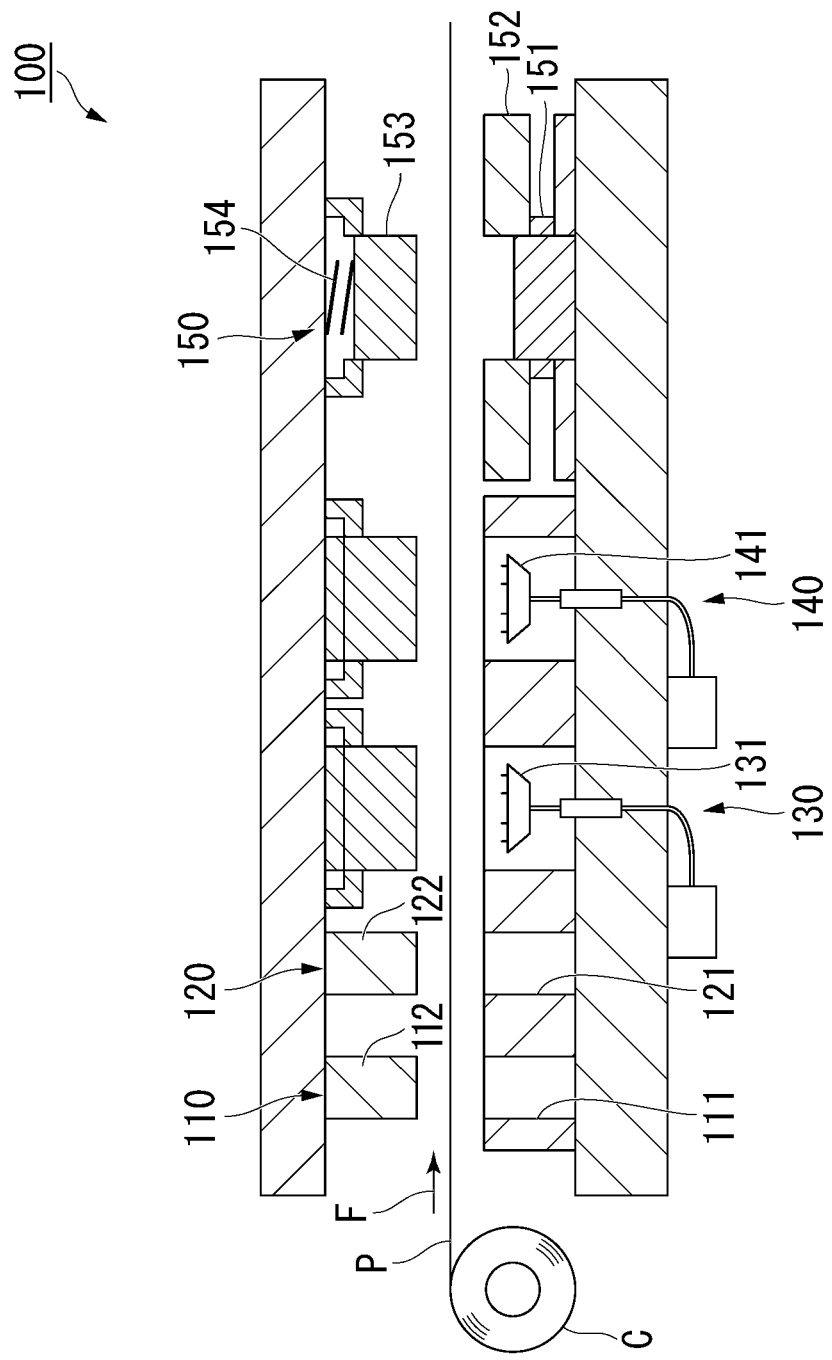
FIG. 4 is a side view illustrating a schematic constitution of an apparatus for manufacturing an adhesively-laminated core for a stator.

As illustrated in FIG. 4, the manufacturing apparatus 100 includes a punching station 110 (first stage) at a position closest to the coil C, a punching station 120 (second stage) disposed closer to the downstream side of the electrical steel sheet P than the punching station 110 in a conveyance direction, a first adhesive-coating station 130 disposed closer to the downstream side than this punching station 120, and a second adhesive-coating station 140 disposed closer to the downstream side than the first adhesive-coating station 130.

The punching station 110 includes a fixed mold 111 disposed below the electrical steel sheet P, and a movable mold 112 disposed above the electrical steel sheet P.

The punching station 120 includes a fixed mold 121 disposed below the electrical steel sheet P, and a movable mold 122 disposed above the electrical steel sheet P.

The first adhesive-coating station 130 and the second adhesive-coating station 140 respectively include applicators 131 and 141 including a plurality of injectors disposed in accordance with the disposition pattern of the adhesion parts 41 described above.

The manufacturing apparatus 100 further includes a stacking station 150 at a downstream position from the second adhesive-coating station 140. This stacking station 150 includes a holding member 151, a fixed mold 152 for an outer shape, a movable mold 153 for an outer shape, and a spring 154.

The holding member 151 and the fixed mold 152 for an outer shape are disposed below the electrical steel sheet P. On the other hand, the movable mold 153 for an outer shape and the spring 154 are disposed above the electrical steel sheet P.

In the manufacturing apparatus 100 having the constitution described above, first, the electrical steel sheet P is sequentially sent out in the arrow F direction in FIG. 4 from the coil C. Further, first, punching is performed at the punching station 110 with respect to this electrical steel sheet P. Subsequently, punching is performed at the punching station 120 with respect to this electrical steel sheet P. Due to these processes of punching, the electrical steel sheet P obtains the shape of the electrical steel sheet 40 having the core back part 22 and the plurality of tooth parts 23 illustrated in FIG. 3. However, since it is not completely punched at this time, the electrical steel sheet proceeds to a next step in the arrow F direction.

At the first adhesive-coating station 130 in the next step, the first agent of the SGA is supplied from each of the injectors of the applicator 131, and a plurality of places on the lower surface of the electrical steel sheet 40 are coated with the first agent in dot shapes. At the second adhesive-coating station 140 in the next step, the second agent of the SGA is supplied from each of the injectors of the applicator 141, and the second agent is coated in dot shapes on the first agent coated by the first adhesive-coating station 130. Coating with the second agent may be performed at the first adhesive-coating station 130, and coating with the first agent may be performed at the second adhesive-coating station 140.

Further, last, the electrical steel sheet P is sent out to the stacking station 150, punched by the movable mold 153 for an outer shape, and accurately stacked. For example, misalignment of the electrical steel sheets 40 can be prevented and they can be stacked with higher accuracy by forming notches at a plurality of places in an outer circumferential end part of the core back part and pressing a scale to the notches from a side surface. During stacking, the electrical steel sheets 40 receive a uniform pressurizing force due to the spring 154.

As described above, a predetermined number of electrical steel sheets 40 can be stacked by sequentially repeating the punching step, the coating step of the first agent and the second agent of the SGA, and the stacking step. Moreover, in an iron core formed by stacking the electrical steel sheets 40 in this manner, curing of the SGA proceeds at room temperature, and the adhesion parts 41 are formed.

The stator core 21 is completed through each of the foregoing steps.

Second Embodiment

In place of an SGA, adhesion parts may be formed using an acrylic-based adhesive including an acrylic-based compound and excluding an SGA. Examples of an acrylic-based adhesive excluding an SGA include an anaerobic adhesive.

An electric motor of a second embodiment can have a form similar to that of the first embodiment except that an anaerobic adhesive is used in place of an SGA.

Also in the second embodiment using an anaerobic adhesive, compared to a case in which adhesion parts are provided on the entire surface, stress applied to the electrical steel sheets due to curing shrinkage is reduced by partially providing adhesion parts between the electrical steel sheets adjacent to each other in the stacking direction. In addition, since an anaerobic adhesive is cured at room temperature, stress due to the difference between the thermal expansion coefficients is also reduced. For this reason, strain of the electrical steel sheets can be suppressed, and increase in iron loss can be suppressed.

(Anaerobic Adhesive)

An anaerobic adhesive is an acrylic-based adhesive which starts to be cured when oxygen is blocked with the presence of metal ions.

An anaerobic adhesive includes an acrylic-based compound, a polymerization initiator, and an anaerobic curing agent.

An acrylic-based compound included in the anaerobic adhesive is not particularly limited. Examples thereof include (meth)acrylate expressed as $H_2C=CR^1-COOR^2$. However, in the formula, $R^1$ indicates hydrogen atoms, halogen atoms, or an alkyl group of the numbers 1 to 4 of carbon atoms. $R^2$ indicates an alkyl group of the numbers 1 to 16 of carbon atoms, a cycloalkyl group, an alkenyl group, a cycloalkenyl group, an alkaryl group, an aralkyl group, or an aryl group. The group of $R^2$ may have a substitutional group such as halogen atoms, a hydroxy group, or a carboxylic group or may include a divalent group such as a carbonyl group, an ester group, or an amide group.

Examples of (meth)acrylate included in the anaerobic adhesive include methyl (meth)acrylate, ethyl (meth)acrylate, 2-hydroxyethyl (meth)acrylate, 2-hydroxypropyl (meth)acrylate, isobornyl acrylate, polyethylene glycol di(meth)acrylate, hexanediol di(meth)acrylate, trimethylolpropane tri(meth)acrylate, diethylene glycol dimethacrylate, triethylene glycol dimethacrylate, tetraethylene glycol di(meth)acrylate, dipropylene glycol di(meth)acrylate, tetramethylene di(meth)acrylate, ethylene di(meth)acrylate, and neopentyl glycol di(meth)acrylate. One kind or two or more kinds of (meth)acrylate may be included in the anaerobic adhesive.

In terms of a curing rate, it is preferable that (meth)acrylate included in the anaerobic adhesive be one or more selected from the group consisting of di(meth)acrylates, ethyl (meth)acrylate, and 2-hydroxyethyl (meth)acrylate.

The amount of an acrylic-based compound in the anaerobic adhesive is preferably within a range of 50 to 95 mass % and more preferably within a range of 70 to 90 mass % with respect to the total mass of the anaerobic adhesive.

Examples of a polymerization initiator include hydroperoxides such as cumene hydroperoxide, t-butyl hydroperoxide, p-methane hydroperoxide, methyl ethyl ketone peroxide, cyclohexane peroxide, dicumyl peroxide, and diisopropylbenzenehydroperoxide, in addition to organic peroxides such as ketone peroxides, dialyl peroxides, peroxyesters, and the like.

In terms of preservability (pot life), it is preferable that a polymerization initiator included in the anaerobic adhesive be hydroperoxides.

It is preferable that a blending amount of a polymerization initiator be 0.1 to 5 parts by mass with respect to 100 parts by mass of the total mass of the acrylic-based compound. If the blending amount is less than 0.1 parts by mass, it is insufficient for causing polymerization reaction. If the blending amount is larger than 5 parts by mass, stability of the anaerobic adhesive deteriorates.

An anaerobic curing agent is not particularly limited. Examples thereof include toluidines such as N,N-dimethyl-p-toluidine, N,N-diethyl-p-toluidine, and N,N-diethyl-o-toluidine; hydrazines such as saccharin and acetyl phenylhydrazine (APH); benzotriazole; ethyl mercaptan; maleic acid; naftaquinone; and anthraquinone. One kind or two or more kinds of anaerobic curing agents may be included in the anaerobic adhesive.

In terms of preservability (pot life), it is preferable that an anaerobic curing agent included in the anaerobic adhesive be benzotriazole, ethyl mercaptan, or hydrazines.

The amount of an anaerobic curing agent in the anaerobic adhesive is preferably within a range of 0.01 to 5 parts by mass and more preferably within a range of 0.1 to 1 part by mass with respect to 100 parts by mass of the total mass of the acrylic-based compound.

For the same reason as the SGA, it is preferable that the anaerobic adhesive further include an elastomer.

The same elastomers as those described in the SGA can be described as examples. One kind or two or more kinds of elastomers may be included in the anaerobic adhesive. In terms of elasticity of a cured product, it is preferable that an elastomer included in the anaerobic adhesive be NBR.

When the anaerobic adhesive includes an elastomer, the amount of the elastomer varies depending on the kind, the molecular weight, or the like of the elastomer. For example, it is within a range of 1 to 30 mass % with respect to the total mass of the anaerobic adhesive.

When the elastomer includes NBR, the amount of NBR is preferably within a range of 1 to 20 mass % and more preferably within a range of 5 to 15 mass % with respect to the total mass of the anaerobic adhesive. If the amount of NBR is equal to or more than the lower limit value of the range, a more excellent adhesion strength is achieved. If the amount of NBR is equal to or less than the upper limit value of the range, a more excellent curing rate is achieved.

The anaerobic adhesive may include other components in addition to an acrylic-based compound, an anaerobic curing agent, and an elastomer. Examples of other components include maleimide, a reactive diluent, a plasticizer, a polymerization inhibitor, a thickener, and a filler.

For example, the amount of other components in the anaerobic adhesive is within a range of 0 to 10 mass % with respect to the total mass of the anaerobic adhesive.

When an anaerobic adhesive is used, for example, an adhesively-laminated core for a stator can be manufactured by repeating an operation of forming an adhesion part at room temperature by partially coating a portion on a surface of the electrical steel sheet with an anaerobic adhesive and then press-stacking the electrical steel sheet over another electrical steel sheet. For example, an adhesively-laminated core for a stator can be manufactured using a manufacturing apparatus having a form similar to that of the manufacturing apparatus 100 except that the second adhesive-coating station 140 is not included.

Third Embodiment

In place of an SGA, a cyanoacrylate-based adhesive (instant adhesive) including cyanoacrylate may be used as an acrylic-based compound. An electric motor of a third embodiment can have a form similar to that of the first embodiment except that a cyanoacrylate-based adhesive is used in place of an SGA.

Also in the third embodiment using a cyanoacrylate-based acrylic-based adhesive, compared to a case in which adhesion parts are provided on the entire surface, stress applied to the electrical steel sheets due to curing shrinkage is reduced by partially providing adhesion parts between the electrical steel sheets adjacent to each other in the stacking direction. In addition, since a cyanoacrylate-based acrylic-based adhesive is cured at room temperature, stress due to the difference between the thermal expansion coefficients is also reduced. For this reason, strain of the electrical steel sheets can be suppressed, and increase in iron loss can be suppressed.

(Cyanoacrylate-Based Adhesive)

Regarding a cyanoacrylate-based adhesive, an adhesive in which cyanoacrylate is polymerized and cured can be used without limitation. Examples of cyanoacrylate included in the cyanoacrylate-based adhesive include methyl cyanoacrylate, ethyl cyanoacrylate, methoxy ethyl cyanoacrylate, butyl cyanoacrylate, and octyl cyanoacrylate. One kind or two or more kinds of cyanoacrylate may be included in the cyanoacrylate-based adhesive.

In terms of workability, it is preferable that the cyanoacrylate-based adhesive include ethyl cyanoacrylate.

For the same reason as the SGA, it is preferable that the cyanoacrylate-based adhesive further include an elastomer.

The same elastomers as those described in the SGA can be described as examples. One kind or two or more kinds of elastomers may be included in the cyanoacrylate-based adhesive. In terms of elasticity of a cured product, it is preferable that an elastomer included in the cyanoacrylate-based adhesive be NBR.

The amount of cyanoacrylate in the cyanoacrylate-based adhesive is preferably within a range of 50 to 95 mass % and more preferably within a range of 70 to 90 mass % with respect to the total mass of the cyanoacrylate-based adhesive.

When the cyanoacrylate-based adhesive includes an elastomer, the amount of the elastomer varies depending on the kind, the molecular weight, or the like of the elastomer. For example, it is within a range of 1 to 30 mass % with respect to the total mass of the cyanoacrylate-based adhesive.

When the elastomer includes NBR, the amount of NBR is preferably within a range of 1 to 20 mass % and more preferably within a range of 5 to 15 mass % with respect to the total mass of the cyanoacrylate-based adhesive. If the amount of NBR is equal to or more than the lower limit value of the range, a more excellent adhesion strength is achieved. If the amount of NBR is equal to or less than the upper limit value of the range, a more excellent curing rate is achieved.

The cyanoacrylate-based adhesive may include other components in addition to cyanoacrylate and an elastomer. Examples of other components include amines as a curing promotor. Amines are not particularly limited. Examples thereof include toluidines such as N,N-dimethyl-p-toluidine and N,N-diethyl-p-toluidine. When a curing promotor is used, chemical reaction proceeds extremely fast, and thus it is favorable that a curing promotor be blended in the cyanoacrylate-based adhesive immediately before the laminated core is adhered.

For example, the amount of other components in the cyanoacrylate-based adhesive is within a range of 0 to 10 mass % with respect to the total mass of the cyanoacrylate-based adhesive.

When a cyanoacrylate-based adhesive is used, for example, an adhesively-laminated core for a stator can be manufactured by repeating an operation of forming an adhesion part at room temperature by partially coating a portion on a surface of the electrical steel sheet with a cyanoacrylate-based adhesive and then press-stacking the electrical steel sheet over another electrical steel sheet. For example, an adhesively-laminated core for a stator can be manufactured using a manufacturing apparatus having a form similar to that of the manufacturing apparatus 100 except that the second adhesive-coating station 140 is not included.

The technical scope of the present invention is not limited to the embodiments, and various changes can be applied within a range not departing from the gist of the present invention.

The shape of the stator core is not limited to the forms described in the embodiments. Specifically, the dimensions of the outer diameter and the inner diameter of the stator core, the stacking thickness, the number of slots, the dimensional ratio of the tooth part in the radial direction to the circumferential direction, the dimensional ratio of the core back part to the tooth parts in the radial direction, and the like can be arbitrarily designed in accordance with the characteristics of a desired electric motor.

In the rotor according to the embodiments, two permanent magnets 32 in one set form one magnetic pole, but the present invention is not limited thereto. For example, one permanent magnet 32 may form one magnetic pole, or three or more permanent magnets 32 may form one magnetic pole.

In the embodiments, a permanent magnetic electric motor has been described as an example of an electric motor, but the structure of the electric motor is not limited thereto as described below as an example. Moreover, various known structures which are not described below as an example can also be employed.

In the embodiments, a permanent magnetic electric motor has been described as an example of an electric motor, but the present invention is not limited thereto. For example, the electric motor may be a reluctance motor or an electromagnet field motor (wound-field motor).

In the embodiments, a synchronous motor has been described as an example of an AC motor, but the present invention is not limited thereto. For example, the electric motor may be an induction motor.

In the embodiments, an AC motor has been described as an example of an electric motor, but the present invention is not limited thereto. For example, the electric motor may be a DC motor.

In the embodiment, a motor has been described as an example of as an electric motor, but the present invention is not limited thereto. For example, the electric motor may be a generator.

The stator core 21 can be employed in a transformer in place of the electric motor 10. In this case, it is preferable to employ a grain-oriented electrical steel sheet as an electrical steel sheet instead of employing a non-grain-oriented electrical steel sheet.

Furthermore, the constituent elements in the embodiment can be suitably replaced with known constituent elements within a range not departing from the gist of the present invention. In addition, the modification examples may be suitably combined.

Hereinafter, examples of the present invention will be specifically described.

However, the present invention is not limited to these examples.

(Manufacturing Examples 1 to 5)

A first agent and a second agent of an SGA were prepared by mixing the components in proportions shown in Table 1. Although it is not described in the table, acetone was suitably used as a solvent.

(Manufacturing Examples 6 to 9)

An anaerobic adhesive and a cyanoacrylate-based adhesive were prepared by mixing the components in proportions shown in Table 3.

Examples 1 to 6

A hoop having a composition for a non-grain-oriented electrical steel sheet containing Si: 3.0 mass %, Al: 0.5 mass %, and Mn: 0.1 mass % was produced. The thickness of base steel was set to 0.3 mm. This hoop was coated with an insulation coating liquid containing metal phosphate and an acrylic resin emulsion and baked at 300° C., and an insulation coating of a predetermined amount was applied thereto.

Using the manufacturing apparatus 100 having the constitution illustrated in FIG. 4, in the following procedure, this hoop (electrical steel sheet) was punched into single-plate cores having an outer diameter of 300 mm and an inner diameter of 240 mm in a ring shape, in which rectangular tooth parts having a length of 30 mm and a width of 15 mm were provided at 18 places on an inner diameter side, the single-plate cores were sequentially stacked, and a stator core was produced.

The hoop was sequentially sent out in the arrow F direction in FIG. 4 from the coil C. Further, first, punching was performed at the punching station 110 with respect to this hoop. Subsequently, punching was performed at the punching station 120 with respect to this hoop. Due to these processes of punching, the shape of the electrical steel sheet 40 having the core back part 22 and the plurality of tooth parts 23 illustrated in FIG. 3 was formed in the hoop (punching step).

Subsequently, a plurality of places on the lower surface (first surface) of the hoop were coated with the first agent of the SGA in dot shapes by the applicator 131 at the first adhesive-coating station 130. Subsequently, a plurality of places on the lower surface of the hoop were coated with the second agent in dot shapes by the applicator 141 at the second adhesive-coating station 140 (coating step). Coating with the first agent and the second agent was performed in an overlapping manner on the same plane.

Subsequently, the hoop sent out to the stacking station 150 was punched into single-plate cores by the movable mold 153 for an outer shape, and the single-plate cores were stacked while being pressurized (stacking step).

After 130 single-plate cores were stacked by sequentially repeating the punching step, the coating step, and the stacking step, the laminated core discharged from a lower part of the mold was moved to a sample table prepared next to the apparatus. The SGA was cured through curing for five minutes in an atmosphere at 25° C., and a stator core was obtained.

In Examples 1 to 3, the adhesion area ratio of each of the core back part and the tooth parts was changed by changing the coating amounts of the first agent and the second agent. The electrical steel sheets of the stator core obtained in each example peeled from each other, and the average diameter of the adhesion parts and the adhesion area ratio of each of the core back part, the tooth parts, and the electrical steel sheets were measured. Table 2 shows the results.

Examples 7 to 10

In place of an SGA, the anaerobic adhesive shown in Table 4 was used. The average diameter of the adhesion parts, the thicknesses of the adhesion parts, and the adhesion area ratio of each of the core back part, the tooth parts, and the electrical steel sheets were set as shown in Table 4, and a stator core was obtained in a manner similar to that in Example 1 except that the anaerobic adhesive was cured through pressurizing and press-stacking after coating.

Examples 11 to 14

In place of an SGA, the cyanoacrylate-based adhesive shown in Table 4 was used. The average diameter of the adhesion parts, the thicknesses of the adhesion parts, and the adhesion area ratio of each of the core back part, the tooth parts, and the electrical steel sheets were set as shown in Table 4, and a stator core was obtained in a manner similar to that in Example 1 except that the cyanoacrylate-based adhesive was cured through pressurizing and press-stacking after coating.

Comparative Example 1

A stator core was produced in a manner similar to that in Example 1 except that the electrical steel sheet was coated with the first agent and the second agent of the SGA such that the adhesion area ratio thereof is 100%.

Comparative Example 2

A stator core was produced in a manner similar to that in Example 1 except that the SGA of Manufacturing example 4 was used as an adhesive.

Comparative Example 3

A stator core was produced in a manner similar to that in Example 1 except that a one-component type thermosetting epoxy-based adhesive (manufactured by CEMEDINE Co., Ltd. "EP171") was used as an adhesive.

Comparative Example 4

In place of an SGA, the anaerobic adhesive shown in Table 4 was used. A stator core was produced in a manner similar to that in Example 7 except that the electrical steel sheet was coated such that the adhesion area ratio thereof is 100%.

Comparative Example 5

In place of an SGA, the cyanoacrylate-based adhesive shown in Table 4 was used. A stator core was produced in a manner similar to that in Example 11 except that the electrical steel sheet was coated such that the adhesion area ratio thereof is 100%.

(Evaluation)

Regarding the stator core of each example, the following evaluation was performed. Tables 2 and 4 show the results.

<Iron Loss>

An iron loss of the stator was measured using a rotation iron loss-simulator having a rotor-shaped detector with a diameter of 239.5 mm. This rotation iron loss-simulator is disclosed in the Journal of the Institute of Electrical Engineers of Japan, RM-92-79, 1992.

In evaluation of an iron loss of the stator core, as cores which was criteria for evaluation, cores fixed by fastening-stacking and having 10 stacked layers in which eight adhesion parts were formed in the core back part and a fastening having a diameter of 1.5 mm was formed in the central part of all the tooth parts were produced. Measuring of the stator core and the core fixed by fastening-stacking in each example was performed using a rotation iron loss-simulator, and the iron loss was evaluated based on the following criteria.

1: Magnetism is better by 20% or more than the core fixed by fastening-stacking.
2: Magnetism is better by a range of 15% to 20% than the core fixed by fastening-stacking.
3: Magnetism is better by a range of 10% to 15% than the core fixed by fastening-stacking.
4: Magnetism is further improved by a range more than 0% to 10% than the core fixed by fastening-stacking.
5: There is no improvement in magnetism compared to the core fixed by fastening-stacking.

<Productivity>

When a stator core was produced at 150 spm (150 electrical steel sheets were stacked during one minute) using the manufacturing apparatus illustrated in FIG. 4, the fixed condition of the stator core taken out from the mold was checked, and productivity was evaluated based on the following criteria.

1: A stator core could be produced without any problem.
2: After being taken out from the mold, a stator core could be produced by holding it for several seconds to several minutes.
3: After being taken out from the mold, a stator core could be produced by pressurizing stacking surfaces.
4: The electrical steel sheets peeled from each other or stacking was distorted during handling.
5: Fixing between the electrical steel sheets was insufficient.

TABLE 1

|  |  |  | Manufacturing example 1 | Manufacturing example 2 | Manufacturing example 3 | Manufacturing example 4 | Manufacturing example 5 |
|---|---|---|---|---|---|---|---|
| Composition of first agent [parts by mass] | Acrylic-based compound | Methyl methacrylate | 10 |  | 30 |  | 30 |
|  |  | Phenoxyethyl methacrylate |  | 20 |  | 50 | 30 |
|  |  | 2-hydroxyethyl methacrylate |  |  | 60 | 50 |  |
|  |  | 2-hydroxypropyl methacrylate | 60 | 80 |  |  |  |
|  | Oxidizer | Cumene hydroperoxide | 5 |  | 3 | 4 | 3 |
|  |  | Benzoyl peroxide |  | 3 |  |  |  |
|  | Elastomer | NBR | 60 | 50 | 30 | 20 |  |

TABLE 1-continued

|  |  |  | Manufacturing example 1 | Manufacturing example 2 | Manufacturing example 3 | Manufacturing example 4 | Manufacturing example 5 |
|---|---|---|---|---|---|---|---|
| Composition of second agent [parts by mass] | Acrylic-based compound | Methyl methacrylate | 10 |  | 30 |  | 30 |
|  |  | Phenoxyethyl methacrylate |  | 10 |  |  |  |
|  |  | 2-hydroxyethyl methacrylate |  |  |  | 60 |  |
|  |  | 2-hydroxypropyl methacrylate | 90 | 70 |  |  | 30 |
|  | Reducer | Ethylene thiourea |  | 1 |  |  | 1 |
|  |  | Cobalt naphthenate | 1.5 |  | 0.5 | 0.5 |  |
|  | Elastomer | NBR | 60 | 50 | 30 | 20 |  |

TABLE 2

|  |  |  | Example 1 | Example 2 | Example 3 | Example 4 | Example 5 | Example 6 | Comparative example 1 | Comparative example 2 | Comparative example 3 |
|---|---|---|---|---|---|---|---|---|---|---|---|
|  | Adhesive |  | Manufacturing example 1 | Manufacturing example 1 | Manufacturing example 1 | Manufacturing example 2 | Manufacturing example 3 | Manufacturing example 5 | Manufacturing example 1 | Manufacturing example 4 | Epoxy-based |
|  | Curing type of adhesive |  | Curing at room temperature | Curing at room temperature | Curing at room temperature | Curing at room temperature | Curing at room temperature | Curing at room temperature | Curing at room temperature | Curing at room temperature | Thermosetting |
|  | Disposition of adhesion parts between electrical steel sheets |  | Partial | Partial | Partial | Partial | Partial | Partial | Entirety | Partial | Partial |
| Adhesion part | Core back part | Average diameter of adhesion parts [mm] | 12 | 12 | 11 | 12 | 11 | 16 | 12 | 12 | 12 |
|  |  | Adhesion area ratio [%] | 70 | 60 | 80 | 70 | 70 | 50 | 70 | 70 | 80 |
|  | Tooth part | Average diameter of adhesion parts [mm] | 8 | 9 | 8 | 8 | 7 | 9 | 8 | 9 | 8 |
|  |  | Adhesion area ratio [%] | 40 | 30 | 70 | 50 | 50 | 20 | 50 | 50 | 50 |
|  | Entire adhesion area ratio [%] |  | 50 | 40 | 72 | 60 | 60 | 40 | 60 | 60 | 70 |
|  | Thickness [μm] |  | 1.8 | 1.9 | 1.8 | 1.7 | 1.8 | 1.3 | 1.8 | 1.9 | 1.8 |
| Evaluation | Iron loss |  | 1 | 1 | 1 | 1 | 3 | 3 | 5 | 3 | 3 |
|  | Productivity |  | 2 | 2 | 3 | 1 | 3 | 3 | 2 | 4 | 5 |

TABLE 3

|  |  | Manufacturing example 6 | Manufacturing example 7 | Manufacturing example 8 | Manufacturing example 9 |
|---|---|---|---|---|---|
| Acrylic-based compound [parts by mass] | Ethyl methacrylate | 25 | 50 |  |  |
|  | Ethylene glycol dimethacrylate | 25 |  |  |  |
|  | 2-hydroxyethyl acrylate | 27 | 46 |  |  |
|  | Ethyl cyanoacrylate |  |  | 90 | 96 |
| Polymerization initiator [parts by mass] | Cumene hydroperoxide | 1 | 1 |  |  |
|  | Cyclohexane peroxide | 1 | 1 |  |  |
| Curing agent [parts by mass] | Benzotriazole | 0.5 | 0.5 |  |  |
|  | Ethyl mercaptan | 0.5 | 0.5 |  |  |
|  | N,N-dimethyl-p-toluidine |  |  | 2 | 4 |
| Elastomer [parts by mass] | NBR | 20 |  | 8 |  |

TABLE 4

|  |  |  | Example 7 | Example 8 | Example 9 | Example 10 | Example 11 | Example 12 | Example 13 | Example 14 | Comparative example 4 | Comparative example 5 |
|---|---|---|---|---|---|---|---|---|---|---|---|---|
|  | Adhesive | | Manufacturing example 6 | Manufacturing example 6 | Manufacturing example 6 | Manufacturing example 7 | Manufacturing example 8 | Manufacturing example 8 | Manufacturing example 8 | Manufacturing example 9 | Manufacturing example 6 | Manufacturing example 8 |
| Disposition of adhesion parts between electrical steel sheets | | | Partial | Partial | Partial | Partial | Partial | Partial | Partial | Partial | Entirety | Entirety |
| Adhesion part | Core back part | Average diameter of adhesion parts [mm] | 8 | 7 | 8 | 14 | 16 | 16 | 17 | 19 | | |
| | | Adhesion area ratio [%] | 45 | 50 | 50 | 40 | 65 | 60 | 65 | 60 | 100 | 100 |
| | Tooth part | Average diameter of adhesion parts [mm] | 6 | 6 | 5 | 8 | 7 | 6 | 7 | 8 | | |
| | | Adhesion area ratio [%] | 40 | 30 | 25 | 40 | 40 | 30 | 70 | 25 | 100 | 100 |
| | Entire adhesion area ratio [%] | | 42 | 40 | 30 | 40 | 50 | 50 | 68 | 35 | 100 | 100 |
| | Thickness [μm] | | 1.6 | 1.6 | 1.4 | 1.3 | 1.4 | 1.3 | 1.4 | 1.8 | 1.5 | 1.4 |
| Evaluation | Iron loss | | 2 | 2 | 3 | 3 | 3 | 3 | 3 | 3 | 5 | 5 |
| | Productivity | | 2 | 3 | 2 | 3 | 2 | 2 | 3 | 3 | 4 | 5 |

Industrial Applicability

According to the present invention, an iron loss of an electric motor can be suppressed and productivity of an adhesively-laminated core for a stator can be improved. Thus, there is significant industrial applicability.

BRIEF DESCRIPTION OF THE REFERENCE SYMBOLS

10 Electric motor
20 Stator
21 Adhesively-laminated core for stator
40 Electrical steel sheet
41 Adhesion part
42 Adhesion region
43 Non-adhesion region

The invention claimed is:

1. An adhesively-laminated core for a stator comprising:
a plurality of electrical steel sheets which are stacked on one another and of which both surfaces are coated with insulation coatings; and
adhesion parts which are disposed between the electrical steel sheets adjacent to each other in a stacking direction and cause the electrical steel sheets to be adhered to each other,
wherein all sets of the electrical steel sheets adjacent to each other in the stacking direction are adhered via the adhesion parts,
wherein an adhesive forming the adhesion parts is a two-agent type acrylic-based adhesive which includes an acrylic-based compound, an oxidizer, and a reducer and in which a portion of the acrylic-based compound and the oxidizer are assigned to a first agent and the remaining portion of the acrylic-based compound and the reducer are assigned to a second agent,
wherein the acrylic-based compound includes at least one selected from the group consisting of methyl methacrylate, phenoxyethyl methacrylate, 2-hydroxyethyl methacrylate, and 2-hydroxypropyl methacrylate,
wherein the methyl methacrylate is within a range of 0 to 50 mass %, the phenoxyethyl methacrylate is within a range of 0 to 50 mass %, the 2-hydroxyethyl methacrylate is within a range of 0 to 50 mass %, and the 2-hydroxypropyl methacrylate is within a range of 0 to 50 mass % with respect to a total mass of the acrylic-based adhesive,
wherein the adhesion parts are partially provided between the electrical steel sheets adjacent to each other in the stacking direction,
wherein the adhesively-laminated core for a stator includes an annular core back part and a plurality of tooth parts, and
wherein an adhesion area ratio of the core back part via the adhesion parts is within a range of 50% to 80%.

2. An adhesively-laminated core for a stator comprising:
a plurality of electrical steel sheets which are stacked on one another and of which both surfaces are coated with insulation coatings; and
adhesion parts which are disposed between the electrical steel sheets adjacent to each other in a stacking direction and cause the electrical steel sheets to be adhered to each other,
wherein all sets of the electrical steel sheets adjacent to each other in the stacking direction are adhered via the adhesion parts,
wherein an adhesive forming the adhesion parts is an acrylic-based adhesive which includes an acrylic-based compound,
wherein the acrylic-based compound is cyanoacrylate,
wherein the acrylic-based adhesive further includes an elastomer,
wherein the adhesion parts are partially provided between the electrical steel
sheets adjacent to each other in the stacking direction,
wherein the adhesively-laminated core for a stator includes an annular core back part and a plurality of tooth parts, and
wherein an adhesion area ratio of the core back part via the adhesion parts is within a range of 50% to 80%.

3. An adhesively-laminated core for a stator comprising:
a plurality of electrical steel sheets which are stacked on one another and of which both surfaces are coated with insulation coatings; and
adhesion parts which are disposed between the electrical steel sheets adjacent to each other in a stacking direction and cause the electrical steel sheets to be adhered to each other,
wherein all sets of the electrical steel sheets adjacent to each other in the stacking direction are adhered via the adhesion parts,
wherein an adhesive forming the adhesion parts is an acrylic-based adhesive which includes an acrylic-based compound,
wherein the acrylic-based adhesive is an anaerobic adhesive,
wherein the acrylic-based adhesive further includes an elastomer,
wherein the adhesion parts are partially provided between the electrical steel sheets adjacent to each other in the stacking direction,
wherein the adhesively-laminated core for a stator includes an annular core back part and a plurality of tooth parts, and
wherein an adhesion area ratio of the core back part via the adhesion parts is within a range of 50% to 80%.

4. The adhesively-laminated core for a stator according to claim 1,
wherein the acrylic-based adhesive further includes an elastomer.

5. The adhesively-laminated core for a stator according to claim 2,
wherein the elastomer includes acrylonitrile butadiene rubber, and
wherein the acrylonitrile butadiene rubber is within a range of 1 to 20 mass % with respect to a total mass of the acrylic-based adhesive.

6. The adhesively-laminated core for a stator according to claim 1,
wherein an adhesion area ratio of the electrical steel sheets via the adhesion parts is within a range of 20% to 80% between the electrical steel sheets.

7. A method of manufacturing the adhesively-laminated core for a stator according to claim 1 comprising:
repeating an operation of forming the adhesion part at room temperature by coating a portion on a surface of the electrical steel sheet with the first agent and the second agent of the acrylic-based adhesive and then press-stacking the electrical steel sheet over another electrical steel sheet.

8. A method of manufacturing the adhesively-laminated core for a stator according to claim 3 comprising:
repeating an operation of forming the adhesion part at room temperature by coating a portion on a surface of the electrical steel sheet with the acrylic-based adhesive and then press-stacking the electrical steel sheet over another electrical steel sheet.

9. An electric motor comprising:
the adhesively-laminated core for a stator according to claim 1.

* * * * *